F. BRELLE.
FRUIT JAR.
APPLICATION FILED JAN. 22, 1912.
1,042,390.
Patented Oct. 29, 1912.
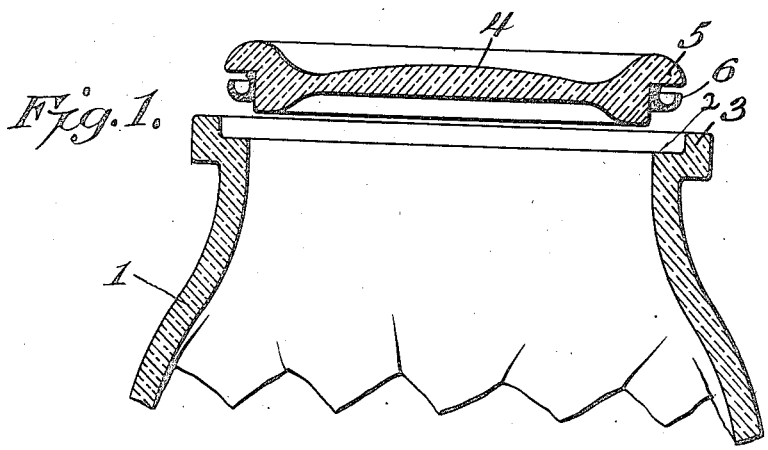
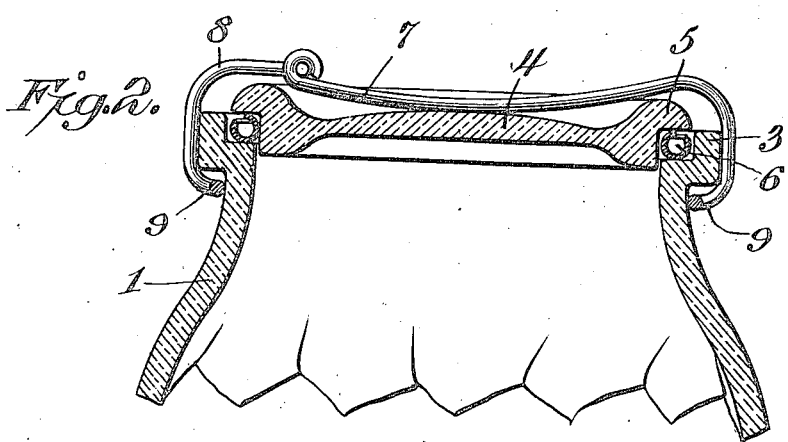
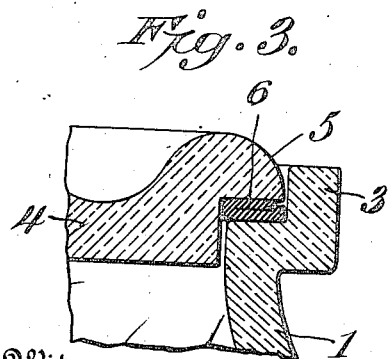
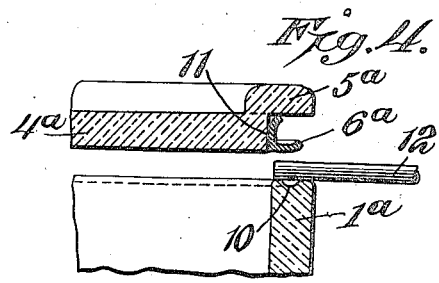
Witnesses
Howard D. Orr.
F. T. Chapman.
Frank Brelle, Inventor,
By E. G. Siggers
Attorney

UNITED STATES PATENT OFFICE.

FRANK BRELLE, OF FERNDALE, CALIFORNIA.

FRUIT-JAR.

1,042,390.

Specification of Letters Patent.  Patented Oct. 29, 1912.

Application filed January 22, 1912. Serial No. 672,629.

*To all whom it may concern:*

Be it known that I, FRANK BRELLE, a citizen of the United States, residing at Ferndale, in the county of Humboldt and State of California, have invented a new and useful Fruit-Jar, of which the following is a specification.

This invention has reference to improvements in fruit jars and its object is to provide a means for sealing the cover or cap to the jar whereby the contents of the jar are sealed against the action of the atmosphere and so are preserved for an indefinite period.

The present invention is an improvement over the fruit jar shown in Letters-Patent No. 983,423, granted to me on February 7, 1911.

In accordance with the present invention there is provided a cap having a peripheral seat adapted to an inner ledge such as found on some commercial forms of fruit jars, and there is also provided a sealing ring in the form of a tube which may be complete peripherally but is incomplete as to its walls when considered in cross section. The ring, which may be of any suitable shape in cross section, is hollow and a portion of the walls all around the ring is omitted so that when pressure is brought to bear upon the ring it will collapse readily, the air escaping from the interior of the ring through the omitted portion of the walls thereof, and the arrangement is such that when the cover is applied and pressed down upon the ring the latter will collapse to a flat condition.

In the use of the invention, the jar is filled with the material to be preserved, the cover with the ring carried thereby is placed upon the top of the jar lightly, and a holding device is applied to the jar and the top thereof in a manner to prevent the top of the jar from moving away from the body of the jar, but at the same time the ring is under no material pressure and maintains to a great extent its original form. The contents of the jar are heated in the usual manner and any steam so formed finds escape about the sealing ring or gasket, but the structure of the latter is such that any flow of air from the exterior of the jar to the interior thereof is prevented by the sealing action of the gasket. When the heating is discontinued and the contents of the jar begin to cool the external atmospheric pressure, because of the condensation of the vapors within the jar, causes the cover to move toward the jar against the resistance of the gasket, which latter prevents any entrance of atmospheric air into the jar and consequently the sealing is caused and maintained by atmospheric pressure, so that after the contents of the jar have cooled sufficiently, the holding device may be removed. The form of the gasket causes it to operate as a cushion during the sealing process, thereby preventing breakage of either the jar or cover.

The invention will be best understood from a consideration of the following detailed description, taken in connection with the accompanying drawings forming a part of this specification, with the understanding, however, that the invention is not confined to any strict conformity to the showing of the drawings, but is susceptible of various changes and modifications so long as the salient features of the invention are retained and the results sought are obtained.

In the drawings:—Figure 1 is a diametric section in the direction of the length of a jar constructed in accordance with the present invention showing the cover slightly raised from the jar. Fig. 2 is a similar view showing the cover in place but not sealed and a holding clip also in place. Fig 3 is a detail section through a portion of the jar and cover showing the position of the parts when the sealing is complete. Fig. 4 is a view similar to Fig. 3 but illustrating a modification and showing the cover and body of the jar separated.

Referring to the drawings, there is shown a portion of a fruit jar 1 which may be taken as typical of any suitable form of fruit jar, whether of existing shapes or of special shape. In the form shown in Figs. 1, 2 and 3 the mouth of the jar is formed with an inwardly directed annular ledge or flange 2 located a short distance below the margin of the mouth of the jar, which therefore upstands from the ledge or shoulder 2, when the jar is on a level support, in the form of a marginal flange 3. Adapted to the mouth of the jar is a cover 4 of a diameter to fit easily within the inner wall of the ledge 2, and this cover is formed with an outstanding marginal flange 5 adapted to the ledge 2 and of a radial extent permitting it to move within the space defined by the flange 3. There is provided a ring or gasket 6 usually of soft vulcanized rubber, but which may be made of any suitable material, and this ring is a tubular ring of any suitable cross sectional shape and which may be split circumferentially, so that the walls of the tubular gasket are incomplete. In the particular showing of the drawings the tube is U-shape in cross section with the terminal portions of the legs of the U slightly approaching but such shape may be varied within considerable limits. When the gasket 6 is applied to the cover 4 the legs of the U are toward the flange 5, so that the rounded portion of the U will engage the ledge 2.

Assuming that the jar 1 is filled with the material to be preserved, the cover 4 with the gasket 6 is applied to the mouth of the jar, so that the gasket will rest on the ledge 2 and support the cover, and in order that the cover may not be forced from the jar during the subsequent operations, a clip comprising two hinged members 7, 8 each having hook shaped terminations 9 is applied to the jar with the hooks underriding the inset portions of the neck of the jar and the middle portion of one of the members, say the member 7, lightly engaging the center portion of the cover, the member 7 being appropriately bent for the purpose, but under these circumstances the ring or gasket 6 is not collapsed to any material extent. The jar is now subjected to the action of heat until the contents of the jar are suitably cooked, such operation producing more or less steam or vapor, which because of the collapsible nature of the gasket to forces applied in a certain direction find ready escape around the gasket between the cover 4 and the mouth of the jar. When the cooking is finished the interior of the jar above the heavier materials is occupied by vapor or steam which as the cooling progresses condenses, thereby producing a condition of sub-atmospheric pressure within the jar, wherefore there is superior pressure exterior to the jar tending to force the atmospheric air into the jar, but the gasket being open toward the outside presents a wide surface subject to such atmospheric pressure and the gasket is spread out against the margin of the cover 4 and the upper surface of the ledge 2 thereby sealing the jar against the entrance of atmospheric air. The superior pressure of the air upon the cover 4 forces the latter toward the mouth of the jar, thereby compressing the gasket, the air within the latter finding ready escape through the open portion of the ring or gasket to the atmosphere until finally the ring or gasket is flattened, as indicated in Fig. 3, when the entrance of air to the interior of the jar is effectually prevented, while the atmospheric pressure being considerably superior to the pressure within the jar holds the cover firmly in place and the broad surface presented by the gasket when flattened effectually seals the joint between the cover and jar against the entrance of atmospheric air for indefinite periods of time.

As soon as the contents of the jar have cooled sufficiently to cause the seating of the cover against the gasket and the latter against the ledge 2 in the collapsed condition, the holding device 7, 8 may be removed, since its only function is to hold the cover in place during the cooking operation.

In Fig. 4 there is shown a modification of the invention, wherein the jar 1ª is formed at its mouth end with a comparatively shallow circumferential groove 10 to receive a portion of the gasket 6ª and the cover 4ª of the jar is formed with a circumferential flange 5ª and a marginal shoulder 11 to which is applied the gasket 6ª and when suitable pressure is brought upon the cover the flange 5ª will flatten out the ring or gasket 6ª in a manner similar to the showing of Fig. 3 and the sealing of the jar is brought about in the same manner as before, the portion of the gasket on the jar 1ª being forced into the groove 10 insuring the thorough sealing. However, there is employed in the form shown in Fig. 4, a small tube 12 which allows escape of air or vapor through and around it while the cover is being closed onto the jar, this tube to be withdrawn after the cover has been positioned and nearly seated when the gasket will spring into the space occupied by the tube and complete the sealing in the manner described with reference to the other constructions. A knife blade or a piece of wire may be used in place of the tube as a temporary auxiliary venting means.

The tubular ring or gasket open along one side throughout its length so that the walls of the ring are incomplete in cross section presents a structure very readily manufactured, which will fit the shoulder at the periphery of the cover, and which will collapse against the ledge or seat at the mouth of the jar, the air within the tubular gasket finding ready escape to the atmosphere while such a gasket does not in any manner interfere with the escape of steam or hot air from the jar and acts as a cushion during the cooling of the jar and the condensation of the steam therein, thus preventing danger of breakage of either the jar or the cover.

What is claimed is:—

1. A means for closing and sealing the mouths of jars, comprising a tubular gasket in the form of a complete ring open along the side remote from the center of the ring throughout the circumference of said side, the tubular gasket being shaped to fold together along a substantially intermediate circumferential line on the side of the gasket toward the center and when so folded constituting a ring shaped gasket of double thickness.

2. A jar of frangible material having a circumferential support at its mouth, a cover for the jar also of frangible material having a flange adapted to said support, and a tubular gasket of elastic material adapted to be interposed between the flange of the cover and the support of the jar, said gasket being open throughout its circumference on that side remote from the center of the gasket and shaped to fold together along a substantially intermediate circumferential line on the side toward the center of the gasket to form when so folded a ring-shaped gasket of double thickness.

3. A preserving jar having at the mouth end an inwardly directed ledge and a circumferential flange upstanding from the ledge exterior thereto, a cover member provided with a peripheral portion of an external diameter less than the internal diameter of the ledge and provided with an outstanding flange adapted to override the ledge within the upstanding flange of the jar, and a sealing ring or gasket of tubular form with a portion of its walls remote from the center of the gasket omitted throughout the circumference to form a vent toward the exterior of the jar, said gasket being adapted to the periphery of the cover to seat on the ledge of the jar between said ledge and the outstanding flange of the cover and shaped to fold together upon a circumferential line intermediate of the edges of the walls defined by the omitted portion to form when so folded a ring-shaped gasket of double thickness.

4. In a preserving jar, a collapsible tubular ring shaped gasket having a portion of its walls omitted throughout the circumferential length of the ring, said omitted portion comprising less than half the cross sectional extent of said walls.

In testimony, that I claim the foregoing as my own, I have hereto affixed my signature in the presence of two witnesses.

FRANK BRELLE.

Witnesses:
H. C. BURNE,
A. W. BLACKBURN.